US006330617B1

(12) United States Patent
Bamforth et al.

(10) Patent No.: US 6,330,617 B1
(45) Date of Patent: Dec. 11, 2001

(54) SYSTEM, METHOD AND COMPUTER PROGRAM PRODUCT FOR DATA CONVERSION IN A COMPUTER NETWORK

(75) Inventors: John Bamforth, Richardson; Glenn Huber, Euless; Aravinda Shenoy, Grapevine; Sudha Akshayakumar, Plano; Srinivas Karra; Kevin Buckley, both of Grapevine; Kenneth P. Thorpe, III, Plano, all of TX (US)

(73) Assignee: Sabre Inc, Forth Worth, TX (US)

( * ) Notice: Subject to any disclaimer, the term of this patent is extended or adjusted under 35 U.S.C. 154(b) by 0 days.

(21) Appl. No.: 09/031,671

(22) Filed: Feb. 27, 1998

(51) Int. Cl.⁷ .................................................. G06F 15/16
(52) U.S. Cl. ..................... 709/246; 709/203; 707/573
(58) Field of Search ............................ 707/523; 709/246, 709/203

(56) References Cited

U.S. PATENT DOCUMENTS

| | | |
|---|---|---|
| 4,417,322 | 11/1983 | Berry et al. . |
| 4,441,829 | 4/1984 | Hebert, Jr. et al. . |
| 4,445,795 | 5/1984 | Levine et al. . |
| 5,050,071 | 9/1991 | Harris et al. . |
| 5,119,465 * | 6/1992 | Jack et al. ............................ 395/500 |
| 5,173,853 | 12/1992 | Kelly et al. . |
| 5,202,977 | 4/1993 | Pasetes, Jr. et al. ................. 395/500 |
| 5,283,887 | 2/1994 | Zachery . |
| 5,317,568 | 5/1994 | Bixby et al. . |
| 5,341,477 | 8/1994 | Pitkin et al. . |
| 5,412,566 | 5/1995 | Sawa . |
| 5,434,852 | 7/1995 | La Porta et al. . |
| 5,461,611 | 10/1995 | Drake, Jr. et al. . |
| 5,473,608 | 12/1995 | Gagne et al. . |
| 5,491,693 | 2/1996 | Britton et al. . |
| 5,491,800 | 2/1996 | Goldsmith et al. . |
| 5,499,343 | 3/1996 | Pettus . |
| 5,506,985 | 4/1996 | Motoyama et al. . |
| 5,509,010 | 4/1996 | La Porta et al. . |
| 5,509,123 | 4/1996 | Dobbins et al. . |
| 5,557,780 * | 9/1996 | Edwards et al. . |
| 5,590,281 | 12/1996 | Stevens . |
| 5,608,874 * | 3/1997 | Ogawa et al. ........................ 709/246 |
| 5,708,828 * | 1/1998 | Coleman .............................. 707/523 |
| 5,774,668 | 6/1998 | Choquier et al. .................... 709/223 |
| 5,828,847 | 10/1998 | Gehr et al. ........................... 709/239 |
| 5,832,451 | 11/1998 | Flake et al. .............................. 705/5 |
| 5,911,776 * | 6/1999 | Guck .................................... 709/217 |
| 6,119,137 * | 9/2000 | Smith et al. ......................... 707/523 |

FOREIGN PATENT DOCUMENTS

| | | |
|---|---|---|
| 0 240 145 A | 10/1987 | (EP) . |
| 0 471867 A1 | 2/1992 | (EP) . |
| WO 97/29424 A | 8/1997 | (WO) . |
| WO 99/44155 | 9/1999 | (WO) . |

OTHER PUBLICATIONS

Henry Schlieper, "Henry's Yellow UN/EDIFACT Book; Introduction to UN/EDIFACT Messages," 10$^{th}$ revised issue (Oct. 1996) (table of contents).

SABRE Generalized Data Streams; Application Program Interface (API) Implementation Guide, The SABRE Group, Inc. Jan. 7, 1997.

(List continued on next page.)

Primary Examiner—Krisna Lim
(74) Attorney, Agent, or Firm—Finnegan, Henderson, Farabow, Garrett & Dunner, L.L.P.

(57) ABSTRACT

Conversion of a data in a variable field message to a fixed format message. The variable field message has a varying length and fields of varying types of data. The corresponding fixed format message has fields of a fixed data type and length, which facilitates parsing and processing data from the variable field message. Customers for the data conversion or other processing are load balanced among multiple servers sharing load level information.

53 Claims, 6 Drawing Sheets

OTHER PUBLICATIONS

SABRE Generalized Data Streams; Programmer's Reference Manual for MS DOS and MS Windows Environments, The SABRE Group, Inc. (Oct. 2, 1997).

SUDO, Takuma, "Infrastructure for Distributed Objects," Hitachi Review, vol. 45, No. 3, Jun. 1996, pp. 155–160.

"Method for Universal MAC Frame Encoding," IBM Technical Disclosure Bulletin, vol. 35, No. 2, Jul. 1992, pp. 489–493.

PCT International Search Report, PCT/US 99/04070, Dec. 15, 1999.

* cited by examiner

SYSTEM, METHOD AND COMPUTER PROGRAM PRODUCT FOR DATA CONVERSION IN A COMPUTER NETWORK

FIELD OF THE INVENTION

The present invention relates to an apparatus and method for performing conversion of data and for load balancing between machines in a computer network.

BACKGROUND OF THE INVENTION

A computerized reservation system (CRS) traditionally has provided a communications network for travel agents or other persons to book airline reservations. Other companies may interface their computer systems with a CRS in order to make information concerning their services available via the CRS. For example, a hotel company may interface its reservation system with a CRS so that when a person books an airline reservation, he or she may also make a hotel reservation through the same network.

CRS's typically use a complex protocol for identifying and transferring data. Other companies desiring to interface their computer systems with a CRS, therefore, may find it difficult or expensive to modify their computer systems to accommodate the complex protocol of a CRS. This situation may discourage other companies from interfacing their computer systems with a CRS, which limits the available information via that network.

In addition, customers interfacing their computer systems with a CRS are typically routed through servers (or other machines) interfacing with the CRS. Generally, different servers are assigned to particular customers and service only those customers, each customer being typically routed through only one server. Therefore, if that server becomes nonfunctional, service to the customer is unavailable until the server can be brought back into operation or back on-line.

Accordingly, a need exists for data conversion and for load balancing access to a CRS or other computer network.

SUMMARY OF THE INVENTION

An apparatus consistent with the present invention converts message formats. The apparatus receives an input message in a variable field format and identifies data types for each field of the input message. The apparatus assembles an output message having multiple fields defined by a fixed format, and it maps data from the input message to specified fields in the output message based on the identified data types.

A method consistent with the present invention provides for computer-implemented message format conversion. The method receives an input message in a variable field format and identifies data types for each field of the input message. The method assembles an output message having multiple fields defined by a fixed format, and it maps data from the input message to specified fields in the output message based on the identified data types.

Another apparatus consistent with the present invention provides for load balancing of processing provided by multiple server machines interfaced with a client machine servicing multiple customers. The apparatus assigns each of the customers to a set of the server machines and stores load levels of each of the server machines. The apparatus services the customers using the server machines to which they are assigned based upon the load levels. If the server machines to which they are assigned are unavailable, the apparatus services the customers using the server machines to which they are temporarily assigned during the unavailability.

Another method consistent with the present invention load balances processing provided by multiple server machines interfaced with a client machine servicing multiple customers. The method assigns each of the customers to a set of the server machines and stores load levels of each of the server machines. The method services the customers using the server machines to which they are assigned based upon the load levels. If the server machines to which they are assigned are unavailable, the method services the customers using the server machines to which they are temporarily assigned during the unavailability.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Figure 1:
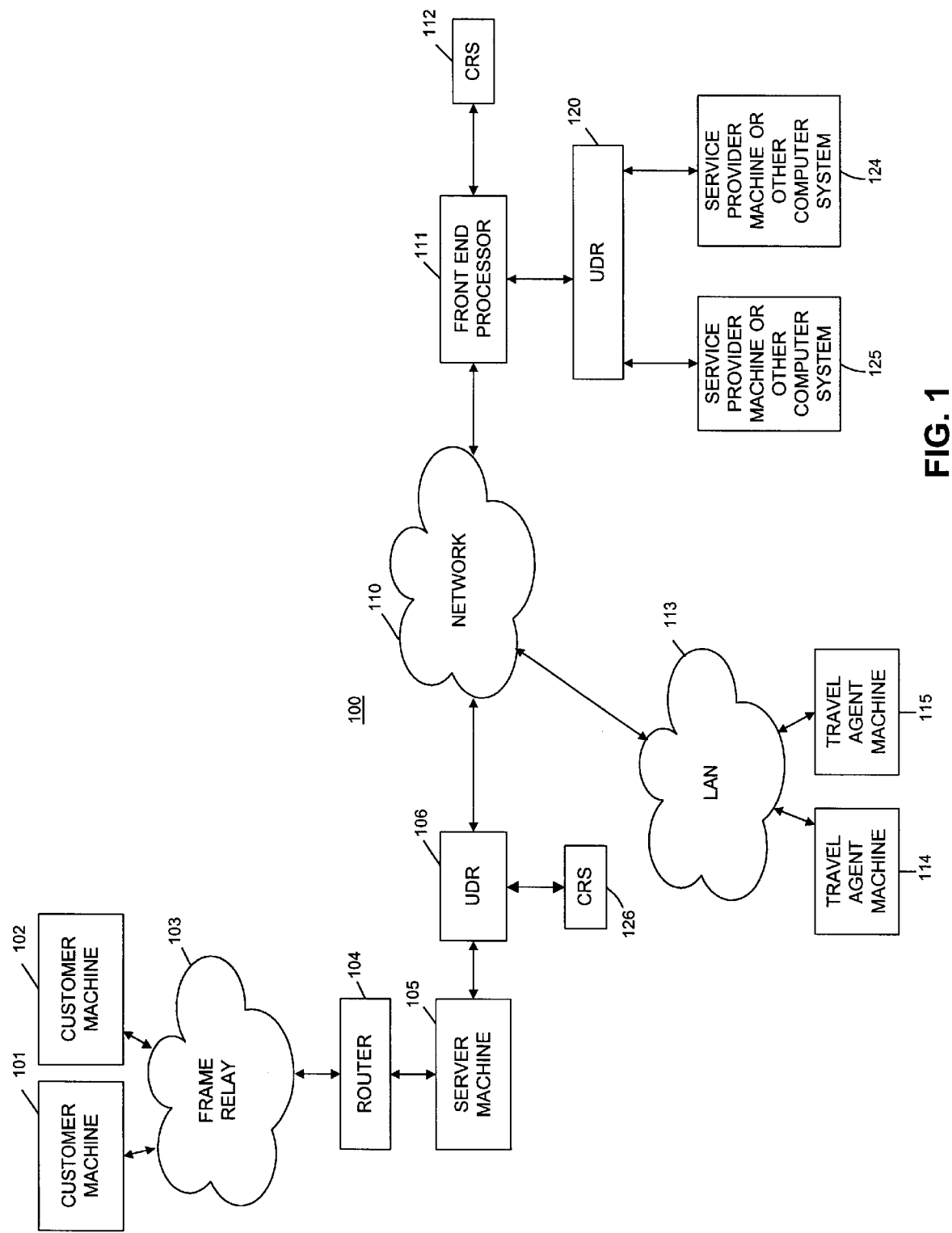
FIG. 1 is a diagram of an exemplary computer network in which systems consistent with the present invention may be implemented including multiple CRS's.

FIG. 1 is a diagram of an exemplary network 100 including multiple CRS's. CRS's are networks permitting access to, for example, travel-related information for making reservations or obtaining such information, and CRS's may use and provide other types of information, depending upon the computer systems interfaced with a particular CRS or the information accessible by the CRS. CRS's are also referred to as computer reservation systems or central reservation systems. In European countries, for example, CRS's are often referred to as global distribution systems. The term "computerized reservation system" and the abbreviation "CRS" are intended to encompass computerized reservation systems, computer reservation systems, central reservation systems, and global distribution systems. Examples of CRS's include those known by the following trademarks and companies: SABRE; AMADEUS; WORLDSPAN; SYSTEM ONE; APOLLO; GEMINI; GALILEO; and AXESS.

Network 100 illustrates how customers or service providers may be linked together through a CRS 112 or 126. For example, customer machines 101 and 102 may represent machines located at particular corporations or other entities for providing travel-related and other services for that corporation or entity. Customer machines 101 and 102 are typically interfaced through a frame relay 103 and a router 104 to a server machine 105. Router 104 provides for routing of a protocol over frame relay 104 for long distance communication. Frame relays and routers are known in the art. Server machine 105 provides necessary interaction between the ultimate customer machines and a CRS, for example, CRS 126.

Server machine 105 is typically interfaced through a universal data router (UDR) 106 to a network 110. UDR 106 may include several servers, as explained below, for performing data conversion for server 105 to communicate with a CRS, for example, CRS 126. Network 110 may represent a private network such as the Societe Internationale Telecommunications Aeronautiques (SITA) network. Network 110 interfaces UDR 106 with a front end processor 111, which provides an interface to a CRS 112. CRS's usually include a front end processor, which are known mainframe components, providing functionality for interfacing the CRS with a network. Customer machines 101 and 102 may also be interfaced with other CRS's 126 through UDR 106. Therefore, when a person at customer machine 101 or 102 desires to, for example, book a travel-related reservation or access other types of information, a communications link is established through the various elements between the customer machine and CRS 112 or 126.

In addition, network 110 may interface travel agent machines with CRS 112 or 126. In particular, network 110 may interface a local area network (LAN) 113 connected to travel agent machines 114 and 115. Travel agent machines 114 and 115, if located overseas, may also be linked into CRS 112 or 126, in which case network 110 may interface token ring LAN 113 through an international telephone or computer network (not shown). Travel agent machines, and LANs are known in the art.

Other companies or service providers may also provide information available via CRS 112. They provide such information by interfacing service provider machines (or other computer systems) 124 and 125 through UDR 120 to front end processor 111. UDR 120, which may include several servers as explained below, provides data conversion to interface the computer systems of service provider machines 124 and 125 with the protocol used by CRS 112. Alternatively, service provide machines 124 and 125 may interface with UDR 106 or CRS 126.

Data Conversion

Data conversion is useful, for example, for converting messages in a variable field format into a fixed format, making it easier for service providers to communicate electronically with a CRS that employs the Edifact protocol, explained below, based on a variable field message format. CRS's typically operate using the Edifact protocol, which is complex. A challenge for companies operating CRS's who want to add other computer systems to the CRS involves making it cost-effective for the other computer systems to interface with data in the Edifact protocol. A data conversion explained below, for converting from the Edifact protocol to a fixed format message provides an advantage of reducing expense and time for a service provider or other company to interface its computer system with a CRS in comparison to directly with data in the Edifact protocol. An embodiment, consistent with the present invention, converts data in the Edifact protocol to a fixed format message. The availability of information in a fixed format message, rather than having to interface directly with data in the Edifact protocol, significantly reduces the complexity of interfacing computer systems with the CRS. Interfacing other computer systems with a CRS increases the information available through the CRS and hence may increase the usefulness of the network including the CRS and the systems interfacing it.

Figure 2:
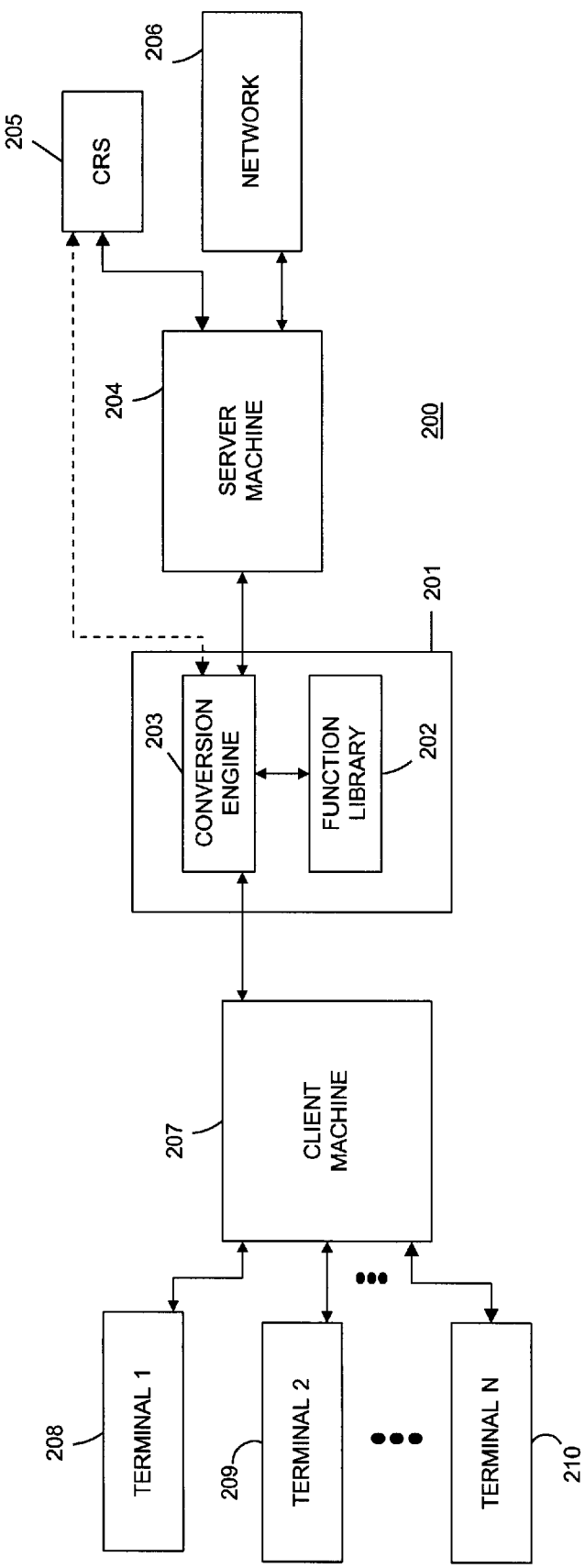
FIG. 2 is a diagram of an exemplary apparatus for performing data conversion.

FIG. 2 is a diagram of a data converter 201 for performing conversion of data. This conversion may be performed, for example, in UDR 120 between CRS 112 and service provider machines 124 and 125 shown in FIG. 1. As shown in FIG. 2, the conversion generally occurs between a client machine 207 and server machine 204. Client machine 207 interfaces with a plurality of terminals 208, 209, and 210. Client machine 207 may represent, for example, a computer system of a service provider, for example, service provider machine 125, providing travel-related services or access to other information, and terminals 208, 209, and 210 may represent computer terminals for users to interact with the computer system, for example, client machine. Server machine 204 interfaces with a CRS 205 and possibly another network 206. Alternatively, data converter 201 may interface directly with a CRS as shown by the dashed line. Data converter 201 includes a conversion engine 203 interfacing a function library 202 for retrieving particular software functions or scripts for performing data conversion depending on the segments or fields within a received message.

As identified above, CRS's, such as CRS 205, typically use a known protocol referred to as the Edifact (electronic data interchange for administration, commerce and transport) protccol or standard. Various versions of the Edifact protocol exist, such as those known as IOTA and UN standards, and the Edifact protocol is used generally for processing data for travel, banking, and industrial purposes. An example of the Edifact protocol is explained in the following document, which is incorporated herein by reference: Henry Schlieper, "Henry's Yellow UN/EDIFACT Book; Introduction to UN/EDIFACT Messages," 10th revised issue (October 1996). The term "Edifact" in this description is intended to cover any version of the Edifact protocol used for any purpose. With reference to FIG. 2, server machine 204 processes, for example, data formatted according to the Edifact protocol, which is complex. Client machine 207, on the other hand, may use its own protocol for the data on which it operates, particularly if client machine 207 represents the computer system of a service provider that does not support the CRS protocol. Data converter 201 provides a fixed format message to client machine 207. Thus, data converter 201 thus may provide a more simple interface for client machine 207 such that client machine 207 need not analyze a message in the complex Edifact or other protocol.

The Edifact protocol is in some respects complex because it includes variable fields. In other words, a particular type of data may appear in different fields depending upon each particular Edifact message, which is data formatted according to the Edifact protocol. There are different types of Edifact messages and examples include, but are not limited to, the following: Availability Request Message (AVLREQ), Availability Response Message (AVLRSP), Profile Request message (PROREQ), Profile Response Message (PRORSP), Reservation Request Message (RESREQ) and Reservation Response Message (RESRSP).

In general, a variable field message includes data formatted according to a variable field protocol. Edifact or other variable field messages may not be of fixed length and, depending on the data to be transmitted, the length of Edifact or other variable field messages may change. Thus, a machine receiving an Edifact or other variable field message cannot necessarily determine that certain data is of a particular type because of the field in which it exists. In order to understand an Edifact or other variable field message, a machine typically has to analyze each segment of data in the message to determine the type of data.

A fixed format message is a record or other data structure in which each particular field is known or predefined so that in a stream of data, for example, each field has a certain length and type of content. With data in a fixed format message, therefore, a machine need only, for example, count bytes to determine fields and data types. Thus, in a fixed format message, the data for each segment is typically at a particular position or offset in the message, which facilities a customer's ease in processing the data and may result in a faster rate of data manipulation than if the customer were to analyze an Edifact or other variable field message.

A fixed format message data structure may be of fixed length for each type of Edifact or other variable field message. A structure for a fixed format message is typically defined depending on a particular Edifact or other variable field message and data required by a customer or a particular application. For each Edifact or other variable field message data structures, one or more fixed format messages may be defined. A fixed format message may be defined by analyzing the Edifact or other variable field message data structure for each type of message and may depend upon the size and characteristics of the messages. The description of data fields for the structure of a fixed format message may change depending on the type of data received or transmitted. It is possible to define one fixed format message for all Edifact messages. However, that fixed format message would be large, containing fields that may not be used by many Edifact messages and potentially adversely affecting processing speed because of its size. Therefore, it may be more advantageous to define a fixed format message for a group of Edifact messages, for example, ten to fifteen Edifact messages for one fixed format message.

Figure 3:
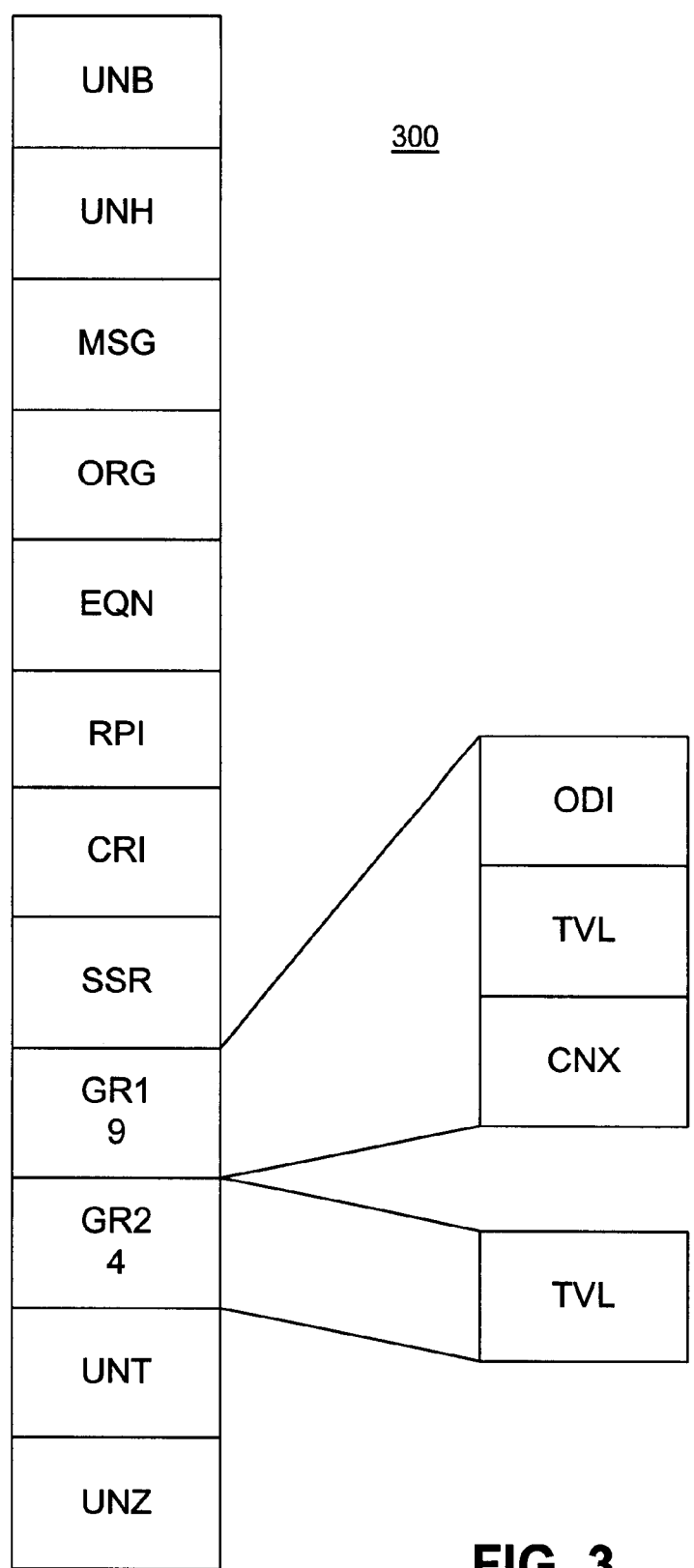
FIG. 3 is a data structure diagram representing an example of a correlation between a variable field protocol and a fixed field protocol.

FIG. 3 is an example of a data structure 300 illustrating a correlation between segments of an Edifact or other variable field message and corresponding fields of a fixed format message. The letters within each box represent a known segment of an Edifact message, and each box has a predefined length in bytes. The linking of the boxes illustrates how the fields are linked together and a definition of each one. The number nine in the box for the group 1 (GR1) segment means that the corresponding group of three segments (ODI, TVL, CNX) are repeated nine times. The number four in the box for the group 2 (GR2) segment means that the corresponding segment (TVL) is repeated four times. This example thus illustrates how variable fields of an Edifact or other variable field message may be translated into a fixed format message so that a system reading such a message knows the type of data in each field and its length. Table 1 provides an explanation of each thee-letter Edifact code in the data structure of FIG. 3.

TABLE 1

| code | meaning |
| --- | --- |
| UNB | interchange header |
| UNH | message header |
| MSG | message segment |
| ORG | origination of request details |
| EQN | number of units |
| RPI | related product information |
| CRI | consumer reference information |
| SSR | special requirements details |
| ODI | origination and destination details |
| TVL | travel product information |
| CNX | connection details |
| UNT | message trailer |
| UNZ | interchange trailer |

Figure 4:
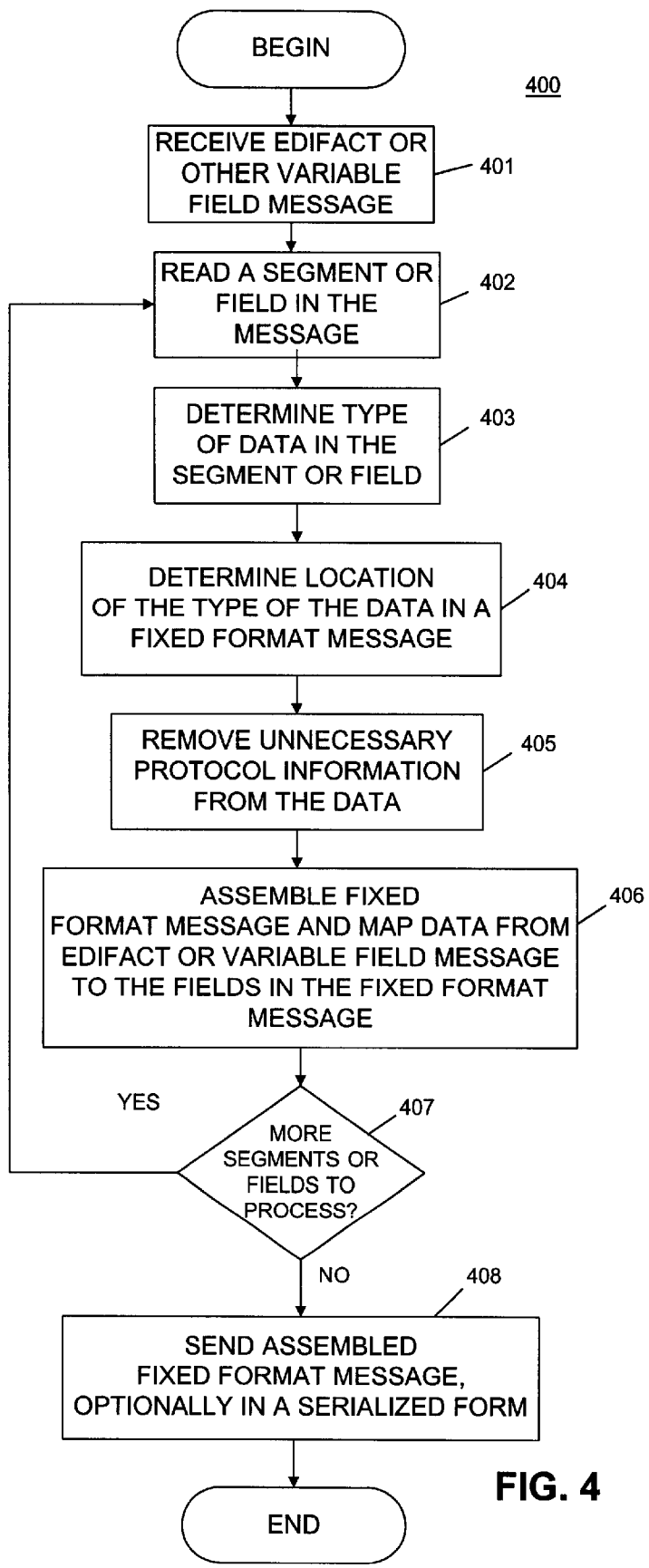
FIG. 4 is a flow chart of a process for performing data conversion from a variable field protocol to a fixed field protocol.

FIG. 4 is a flow chart of a process 400 for performing conversion between an Edifact or other variable field message and a fixed format message. Conversion engine 203 (FIG. 2) includes a processor for implementing the conversion process and retrieving software functions, referred to as scripts, from function library 202 for performing data conversion. For example, to convert each type of fixed format message one or more scripts may be used to perform the data conversion. An advantage of using scripts, or similar software processing, is that they may be modified and reloaded without a modification to the corresponding machine code. Conversion engine 203 may compile scripts at run time and, depending on the data received, it may select the corresponding script or other software function and assemble a fixed format message from data in a variable field message.

As shown in FIG. 4, conversion engine 203 first receives an Edifact or other variable field message, typically including protocol information, from a CRS or other computer system (step 401). It may determine a type of the message based on predefined criteria such as, for example, requirements for the Edifact protocol. Conversion engine 203 reads a segment or field in the message (step 402), and it determines or identifies the type of data in that segment or field (step 403). The determination or identification may involve using the type of message, and it may also involve downloading predefined software functions from function library 202 to analyze particular message segments or fields. Conversion engine 203 determines the location of that type of data in the corresponding fixed format message (step 404), which is typically predefined so that it knows the structure and format of that type of message. Conversion engine 203 may also remove unnecessary protocol information from the data (step 405). The protocol information is generally not required in the fixed format message, as the size and data type of the fields may be predefined or known. Conversion engine 203 assembles the fixed format message and maps data from the Edifact or other variable field message to the fields in the fixed format message (step 406) by positioning the data, typically without the protocol information, in the corresponding fields for that data in the fixed format message.

Conversion engine 203 determines if the Edifact or other variable field message contains more segments or fields to process (step 407). If so, it may repeat steps 402–406 to process those segments or fields. Once the message has been translated and the fixed format message has been assembled, conversion engine 203 sends the assembled fixed format message to a client machine or other computer system or network (step 408), and the system may send it in serialized form.

The following is example of a correlation between an Edifact message and a fixed format message. This example is provided for illustrative purposes only. Any type of fixed format message may be defined for an Edifact or other variable field message. An example of an Edifact message availability request is shown in Table 2.

TABLE 2

```
UNB+UN:1 AALARES:IEDI+XXXX:IEDI+920130:1330+SES0001++AVRL1+E'
UNH+1+AVLREQ:95:1:IA+57482()'
MGS+1:29'
ORG+AA:HDQ+31599253:A0B0+++1+US'EQN+4:9*2:10'
CRI+6:8*6:10'
ODI+DFW*MBJ'
TVL+24121995:1115+DFW*MBJ+DL++++BCO'
CNX+MIA'
ODI+MBJ*DFW'
TVL+12011995:1300+MBJ*DFW+DL++++BCO'
CNX+MIA'
UNT+12+1'
UNZ+1+SES---1---1'
```

The Edifact message shown in Table 2 contains twelve segments such as, for example, UNB and UNH. Each segment may have multiple composites, each composite separated by a "+" symbol. Each element inside a composite may be separated by a ":" symbol. If a segment contains repeating elements, they may be separated by a "*" symbol. The data inside an Edifact or other variable field message may vary depending on the type of message and the required information.

The data in Table 3 shows an example of a correspondence between a fixed format message and the first three segments (UNH, UNB, MSG) of the Edifact message shown in Table 2. Table 3 provides the data field definitions in the first column along with the offset and the size of the data. The other segments may be defined in a similar manner. All data fields may be null terminated to obtain the defined length. For example, the first element in this data structure has a data field size of "5." The data is "UN" and the rest of the field includes three null characters (for example, "0") to obtain a five character field. Other characters may be used to terminate fields. Accordingly, the following is a serialized version of the first five fields of fixed format message shown in Table 3: "UN00010AALARES0000IEDI0XXXX0000000". The remaining fields may be attached in a similar manner by using null termination to obtain the appropriate field lengths.

TABLE 3

| Edifact segment | fixed format field length | data |
|---|---|---|
| AVRQ-UNB.CTRLAGNCYCODE | Size: 5 | 'UN' |
| AVRQ-UNB.SYNTAXVERNO | Size: 2 | '1' |
| AVRQ-UNB.INTAPPTITLE | Size: 11 | 'AALARES' |
| AVRQ-UNB.INTADDRVERSION | Size: 5 | 'IEDI' |
| AVRQ-UNB.APPENTITYTITLE | Size: 11 | 'XXXX' |
| AVRQ-UNB.ADDRVERSION | Size: 5 | 'IEDI' |
| AVRQ-UNB.DATEGMT | Size: 7 | '920130' |
| AVRQ-UNB.TIMEGMT | Size: 5 | '1330' |
| AVRQ-UNB.INTCTLREF | Size: 15 | 'SES00010001' |
| AVRQ-UNB.APPASSCID | Size: 15 | 'SES00010001' |
| AVRQ-UNB.FSEID | Size: 15 | 'AVLR1' |
| AVRQ-UNB.ASSOCCODE | Size: 2 | 'E' |
| AVRQ-UNH.MSGREFNO | Size: 14 | '1' |
| AVRQ-UNH.MSGTYPE | Size: 7 | 'AVLREQ' |
| AVRQ-UNH.MSGVERNO | Size: 3 | '95' |
| AVRQ-UNH.MSGRLSNO | Size: 2 | '1' |
| AVRQ-UNH.CNTLAGENCY | Size: 3 | 'IA' |
| AVRQ-UNH.COMACESREF | Size: 18 | '574820' |
| AVRQ-MSG.BUSFUNCCODE | Size: 4 | '1' |
| AVRQ-MSG.MESSFUNCCODE | Size: 4 | '29' |
| AVRQ-MSG.RESPCODECNT | Size: 4 | '0' |
| AVRQ-MSG-RESPCODE.RESPTYPE | Size: 3 | '0' |
| AVRQ-MSG-RESPCODE.RESPTYPE | Size: 3 | '0' |
| AVRQ-MSG-RESPCODE.RESPTYPE | Size: 3 | '0' |
| AVRQ-MSG-RESPCODE.RESPTYPE | Size: 3 | '0' |
| AVRQ-MSG-RESPCODE.RESPTYPE | Size: 3 | '0' |

Clustering Servers for Load Balancing

Load balancing involves assigning customers to one or more servers for performing processing for the customers. Balancing the customer load among the servers is important, for example, to maintain service to the customers and avoid downtime in which service is unavailable.

Figure 5:
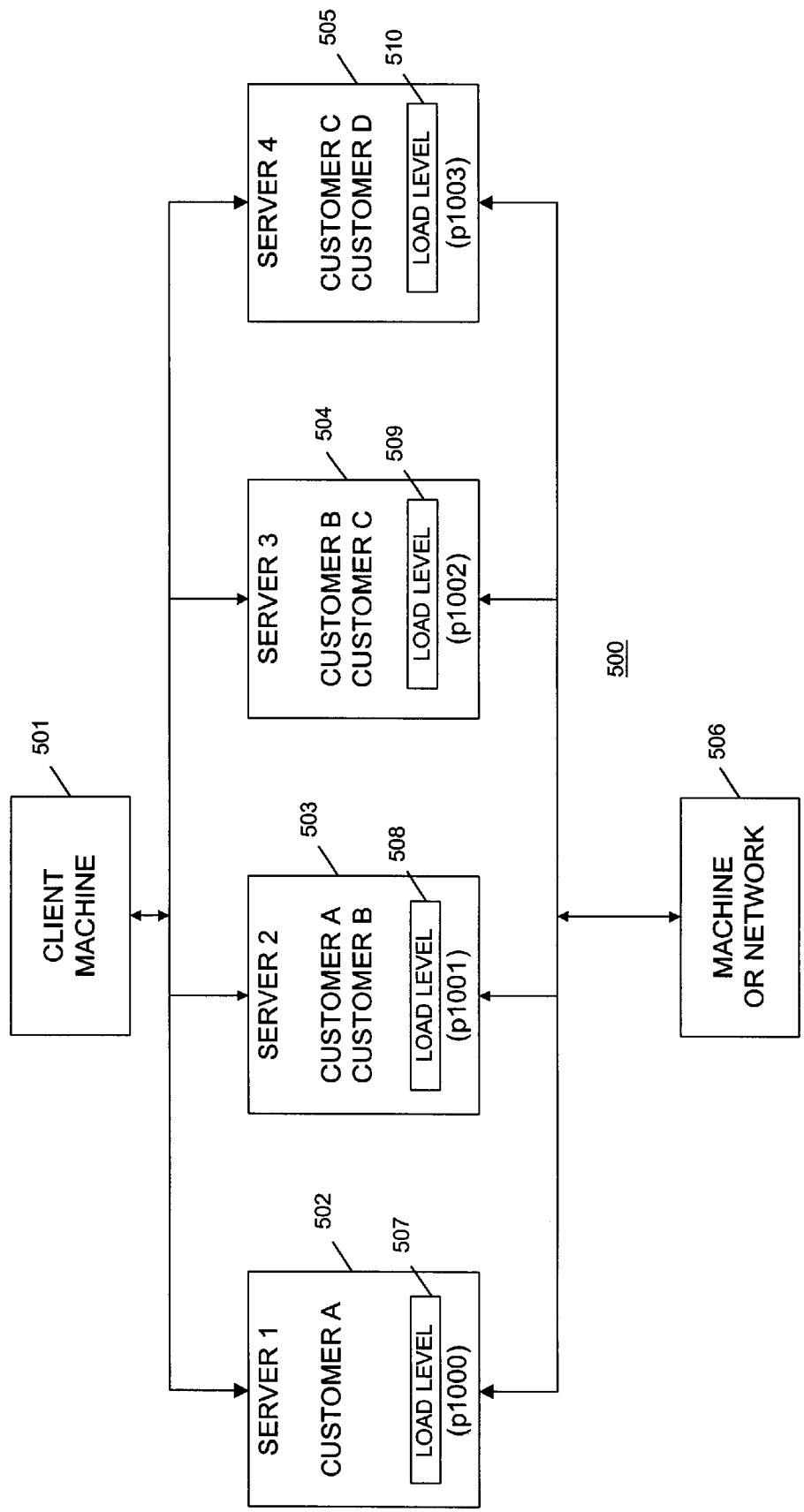
FIG. 5 is a diagram of an exemplary apparatus for performing load balancing.

FIG. 5 is a block diagram illustrating how load balancing may be accomplished in a CRS or computer network. Machine or network 506 interfaces with client machine 501 through, in this example, four servers. These servers include server 502 servicing customer A, server 503 servicing customers A and B, server 504 servicing customers B and C, and server 505 servicing customers C and D. Each customer is thus assigned to one or more servers interfacing client machine 501 with machine or network 506. In addition, each server is typically assigned to a particular port and constitutes the address of that server, as shown by the exemplary port numbers. For example, server 502 is assigned to port 1000 (p1000), and the other servers are assigned in this example to sequential port numbers. Each server typically includes an element, such as a software table or other data structure, for storing load levels for each of the servers, explained below. As shown in FIG. 5, servers 502, 503, 504, and 505 contain, respectively, load level tables 507, 508, 509, and 510. Each server may have a table or other data structure indicating its own load level and the load levels of all other servers. Load levels may indicate, for example, how many customers a particular server machine is currently servicing. Using the load level information provides for additional load level balancing of customer processing by, for example, routing customers through the server with the lowest load level.

Therefore, load balancing may in general be accomplished using the assignment of customers to servers machines and the load level information. In particular, as mentioned above, customers may be assigned for service to a set of the servers, and each server may store load levels of each of the servers. Customers may be serviced using the servers to which they are assigned based upon the load levels. In particular, among the servers to which they assigned, they may be services by the server with the lowest load level. If the servers to which they are assigned are unavailable, the customers may be serviced using the servers to which they are temporarily assigned during the unavailability.

Servers 502–505 may represent, for example, the UDRs explained above. With reference to FIG. 1, client machine 501 may represent server machine 105 or service provider machines 124 and 125, and customers may represent customer machines 101 and 102, or service provider machines 124 and 125. Machine or network 506 may represent network 110, front end processor 111 in combination with CRS 112, or CRS 126. Thus, servers 502–505 may provide, for example, data conversion necessary for customer machines 101 and 102, or service provider machines 124 and 125, to interface with CRS's 126 and 112. The load balancing achieved by servers operating consistent with the present invention may be used in any applicable computer network and for any applicable processing.

Figure 6:
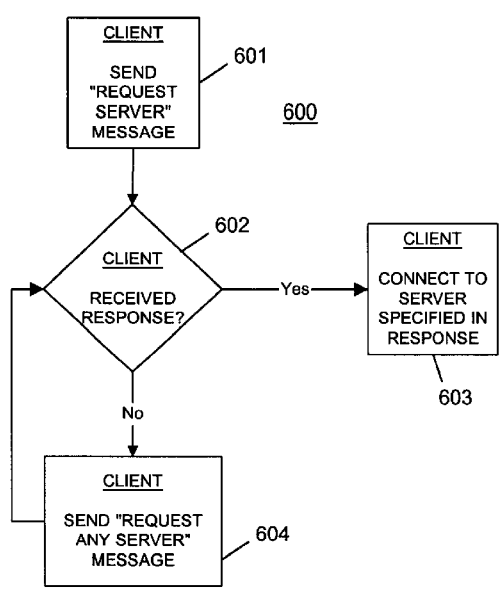
FIG. 6 is a flow chart of a process for a client machine to interface with server machines performing load balancing.

FIG. 6 is a flow chart of a process 600 for client machine 501 to interface with servers 502–504 performing load balancing. Client machine 501 contains a processor and memory for performing the load balancing function. As shown in FIG. 6, the client machine sends a "request server" message, indicating that one of the customer machines needs service by one of the servers to which the customer is assigned (step 601). The client machine may broadcast the message to the ports of servers to which the customer is assigned. The client machine determines if it received a response (step 602). If it received a response, it connects to the server specified in the response (step 603). Otherwise, if it received no response, the client machine sends a "request any server message" (step 604). The client machine broadcasts this message to the ports for all servers.

Figure 7:
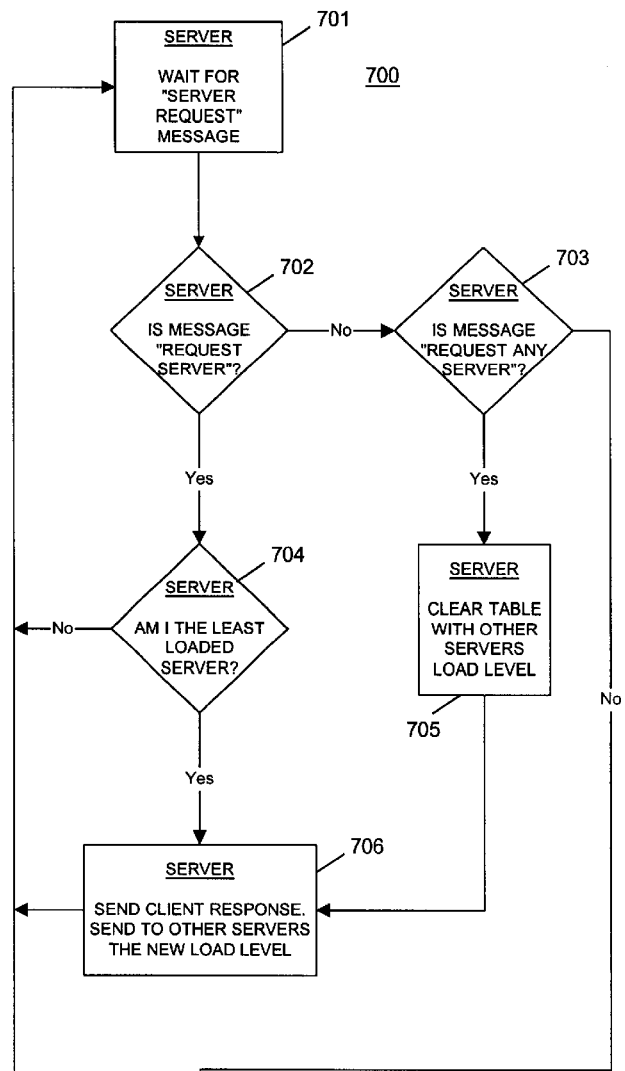
FIG. 7 is a flow chart of a process for server machines performing load balancing to interface with a client machine.

FIG. 7 is a flow chart of a process 700 for servers 502–504 to interface with client machine 501. Each of the servers contains a processor and memory for performing this process. As shown in FIG. 7, each server is in a wait state waiting for a "server request" message from a client machine through an assigned port (step 701). When the server receives a message, it determines if the message is a "request server" message, meaning that a customer assigned to that particular server requested service (step 702). If so, the server determines if it is the least loaded server, which may be accomplished by evaluating its table of server load levels (step 704). The load levels may be stored in tables 507–510 for respective servers 502–505 (see FIG. 5). Load levels may constitute, for example, numerical values indicating how many customers a server is currently servicing.

If the server that received the "server request message, is the least loaded server, it sends a response to the client machine and sends to the other servers its new load level (step 706). The response indicates to the client machine that this particular server is available for servicing the customer requesting service. If the server is not the least loaded server, then it waits for another "server request" message (step 701).

If the received message was not a "request server" message, the server determines if the message is a "request any server" message (step 703). If so, the server clears its table containing the other servers load levels (step 705), and it sends a response to the client machine and sends to the other servers its new load level (step 706).

If the received message is neither of those messages, the server determines if the message is an "update other servers load level" message (step 707). If so, the server updates its table with the other servers new load levels (step 708) and waits for another message (step 708).

Additional servers may join the servers already servicing a group of customers. When a server joins the others, it may be predefined to service a group of customers and may broadcast a message to the other servers identifying itself and its load level. It then may perform the processing described above with respect to FIG. 7.

While the present invention has been described in connection with a preferred embodiment, many modifications will be readily apparent to those skilled in the art, and this application is intended to cover any adaptations or variations thereof. For example, various other components for the elements shown in FIG. 1, different types of variable field messages and fixed format messages for data conversion, and more or fewer servers for load balancing may be used without departing from the scope of the invention. This invention should be limited only by the claims and equivalents thereof.

What is claimed is:

1. A method for formatting a message comprising a plurality of message segments, each of which includes protocol information and a data field wherein the data field varies in size and content from message segment to message segment, comprising the steps of:

partitioning a first message into the message segments;

ordering the message segments based on the protocol information;

fixing the size of the data field in each of the message segments to a standard size;

removing the protocol information from the message segments; and assembling the message segments into a second message, wherein the protocol information comprises one or more symbolic elements corresponding to the content of the data field.

2. The method of claim 1 wherein the ordering, fixing, and removing steps are performed by predefined functions.

3. The method of claim 1 wherein the message of the partitioning step is formatted according to a predetermined protocol.

4. The method of claim 3 wherein the predetermined protocol is the Edifact protocol.

5. The method of claim 1 further comprising the step of: receiving the message from a computer system.

6. The method of claim 5 wherein the computer system comprises a computerized reservation system.

7. The method of claim 1, wherein the one or more symbolic elements each comprise a code.

8. The method of claim 1, wherein the one or more symbolic elements each comprise a delimiter.

9. The method of claim 1, wherein the one or more symbolic elements each comprise a symbol.

10. A method for formatting a message comprising a plurality of message segments, each of which includes a data field of a fixed size but does not include protocol information, comprising the steps of:

partitioning a first message into the message segments;

adding protocol information to each of the message segments based on its relative position in the first message;

varying the size of the data field in each of the message segments based on the protocol information;

ordering the message segments based on the protocol information; and assembling the message segments into a second message, wherein the protocol information comprises one or more symbolic elements corresponding to the content of the data field.

11. The method of claim 10 wherein the adding, varying, and ordering steps are performed by predefined functions.

12. The method of claim 10 wherein the message of the partitioning step is formatted according to a predetermined protocol.

13. The method of claim 12 wherein the predetermined protocol is the Edifact protocol.

14. The method of claim 10 further comprising the step of:

transmitting the message to a computer system.

15. The method of claim 14 wherein the computer system comprises a computerized reservation system.

16. The method of claim 10, wherein the one or more symbolic elements each comprise a code.

17. The method of claim 10, wherein the one or more symbolic elements each comprise a delimiter.

18. The method of claim 10, wherein the one or more symbolic elements each comprise a symbol.

19. A system for exchanging messages comprising:
   a server machine for transmitting and receiving messages comprising a plurality of message segments, each of which includes protocol information and a data field wherein the data field varies in size and content from message segment to message segment;
   a client machine for transmitting and receiving messages with a plurality of message segments, each of which includes a data field of a fixed size but does not contain protocol information; and
   a data converter which refashions messages between the server machine and the client machine such that the protocol information of each message segment is appropriately added and such that the size of the data field in each message segment is appropriately varied,
   wherein the protocol information comprises one or more symbolic elements corresponding to the content of the data field.

20. The system of claim 19 wherein the data converter retrieves and executes software functions from a function library for performing data conversion of messages sent between the server machine and the client machine.

21. The system of claim 19 wherein the data converter reorders message segments.

22. The system of claim 19 wherein the server machine is a computer system.

23. The system of claim 22 wherein the computer system comprises a computerized reservation system.

24. The system of claim 19 wherein the server machine exchanges messages according to a predetermined protocol.

25. The system of claim 24 wherein the predetermined protocol is the Edifact protocol.

26. A computer program storage medium readable by a computer system and encoding a program of instructions for executing a computer process that formats a message, comprising:
   partitioning a first message into one or more message segments;
   ordering the message segments based on protocol information contained in the individual message segments;
   fixing a size of a data field in each of the message segments;
   removing the protocol information from the message segments; and
   assembling the message segments into a second message, wherein the protocol information comprises one or more symbolic elements corresponding to the content of the data field.

27. The computer program storage medium of claim 26 wherein the ordering, fixing, and removing steps of the computer process are performed by predefined functions.

28. The computer program storage medium of claim 26 wherein the message of the partitioning step of the computer process is formatted according to a predetermined protocol.

29. The computer program storage medium of claim 28 wherein the predetermined protocol is the Edifact protocol.

30. The computer program storage medium of claim 26 wherein the computer process further comprises the step of: receiving the message from a computer system.

31. The computer program storage medium of claim 30 wherein the computer system comprises a computerized reservation system.

32. The computer program storage medium of claim 26, wherein the one or more symbolic elements each comprise a code.

33. The computer program storage medium of claim 26, wherein the one or more symbolic elements each comprise a delimiter.

34. The computer program storage medium of claim 26, wherein the one or more symbolic elements each comprise a symbol.

35. A computer program storage medium readable by a computer system and encoding a program of instructions for executing a computer process that formats a message, comprising:
   partitioning a first message into one or more message segments;
   adding protocol information to each of the message segments based on its relative position in the first message;
   varying a size of a data field in each of the message based on the protocol information;
   ordering the data fields based on the protocol information; and
   assembling the message segments into a second message, wherein the protocol information comprises one or more symbolic elements corresponding to the content of the data field.

36. The computer program storage medium of claim 35 wherein the adding, varying, and ordering steps of the computer process are performed by predefined functions.

37. The computer program storage medium of claim 35 wherein the message of the assembling step of the computer process is formatted according to a predetermined protocol.

38. The computer program storage medium of claim 37 wherein the predetermined protocol is the Edifact protocol.

39. The computer program storage medium of claim 35 wherein the computer process further comprises the step of: transmitting the message to a computer system.

40. The computer program storage medium of claim 39 wherein the computer system comprises a computerized reservation system.

41. The computer program storage medium of claim 35, wherein the one or more symbolic elements each comprise a code.

42. The computer program storage medium of claim 35, wherein the one or more symbolic elements each comprise a delimiter.

43. The computer program storage medium of claim 35, wherein the one or more symbolic elements each comprise a symbol.

44. A system for exchanging messages comprising:
   a server machine for transmitting and receiving messages comprising a plurality of message segments, each of which includes protocol information and a data field wherein the data field varies in size and content from message segment to message segment;
   a client machine for transmitting and receiving messages with a plurality of message segments, each of which includes a data field of a fixed size but does not contain protocol information; and
   a data converter which refashions messages between the server machine and the client machine such that the protocol information of each message segment is appropriately removed and such that the size of the data field in each message segment is fixed, wherein the protocol information comprises one or more symbolic elements corresponding to the content of the data field.

45. The system of claim 44, wherein the data converter retrieves and executes software functions from a function library for performing data conversion of messages sent between the server machine and the client machine.

46. The system of claim 44, wherein the data converter reorders message segments.

47. The system of claim 44, wherein the server machine is a computer system.

48. The system of claim 47, wherein the computer system comprises a computerized reservation system.

49. The system of claim 44, wherein the server machine exchanges messages according to a predetermined protocol.

50. The system of claim 49, wherein the predetermined protocol is the Edifact protocol.

51. The system of claim 44, wherein the one or more symbolic elements comprise a code.

52. The system of claim 44, wherein the one or more symbolic elements comprise a delimiter.

53. The system of claim 44, wherein the one or more symbolic elements comprise a symbol.

* * * * *